United States Patent [19]

Martini

[11] 4,373,329

[45] Feb. 15, 1983

[54] TUBULAR EXHAUST MANIFOLD

[75] Inventor: Alfred R. G. Martini, Grass Lake, Mich.

[73] Assignee: Tenneco Inc., Bannockburn, Ill.

[21] Appl. No.: 164,603

[22] Filed: Jun. 30, 1980

[51] Int. Cl.³ .......................... F01N 3/34; F01N 7/10
[52] U.S. Cl. ......................................... 60/305; 60/323
[58] Field of Search ................ 60/305, 313, 323, 282; 239/589, 601

[56] References Cited

U.S. PATENT DOCUMENTS

| 1,338,038 | 4/1920 | Polhemus | 239/589 |
|---|---|---|---|
| 3,401,518 | 9/1968 | McWhirter | 60/305 |
| 3,453,824 | 7/1969 | Biesecker | 60/313 |
| 3,470,690 | 10/1969 | Thompson | 60/323 |
| 3,507,301 | 4/1970 | Larson | 60/323 |
| 3,516,247 | 6/1970 | Knox | 60/313 |
| 3,605,940 | 9/1971 | Christensen | 60/313 |
| 3,653,212 | 4/1972 | Gast | 60/313 |
| 3,662,541 | 5/1972 | Sawada | 60/305 |
| 3,670,844 | 6/1972 | Penfold | 60/313 |
| 3,716,992 | 2/1973 | Stahl | 60/323 |
| 3,722,493 | 3/1973 | Hartmann | 60/313 |
| 3,906,722 | 9/1975 | Garcea | 60/293 |
| 4,197,704 | 4/1980 | Date | 60/323 |

FOREIGN PATENT DOCUMENTS

| 505515 | 12/1954 | Italy | 60/313 |
|---|---|---|---|
| 21699 | of 1905 | United Kingdom | 239/589 |

*Primary Examiner*—Douglas Hart
*Attorney, Agent, or Firm*—Harness, Dickey & Pierce

[57] ABSTRACT

A tubular exhaust gas manifold for an automotive internal combustion engine comprises pipes with flanges for bolting to the side of the engine to separately receive exhaust gas from individual cylinders, the other ends of the pipes being bunched together and welded to a collector that provides a common mixing and outlet chamber for the gases and has a flange for connection to an exhaust pipe. An air feed means is mounted on the pipes and it takes the form of an air log supported on the pipes by means of the air runner tubes that deliver air separately to the individual pipes.

17 Claims, 7 Drawing Figures

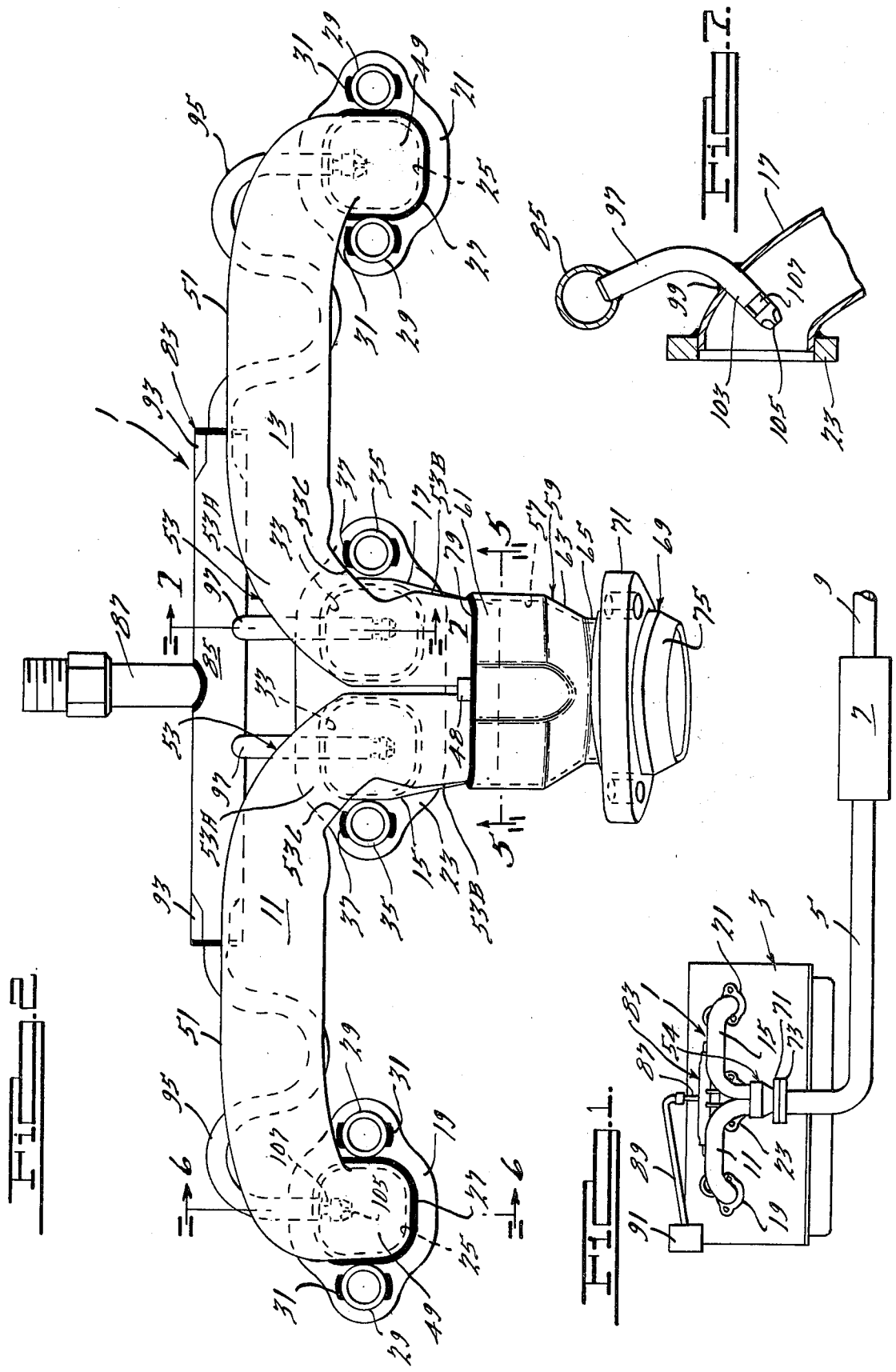

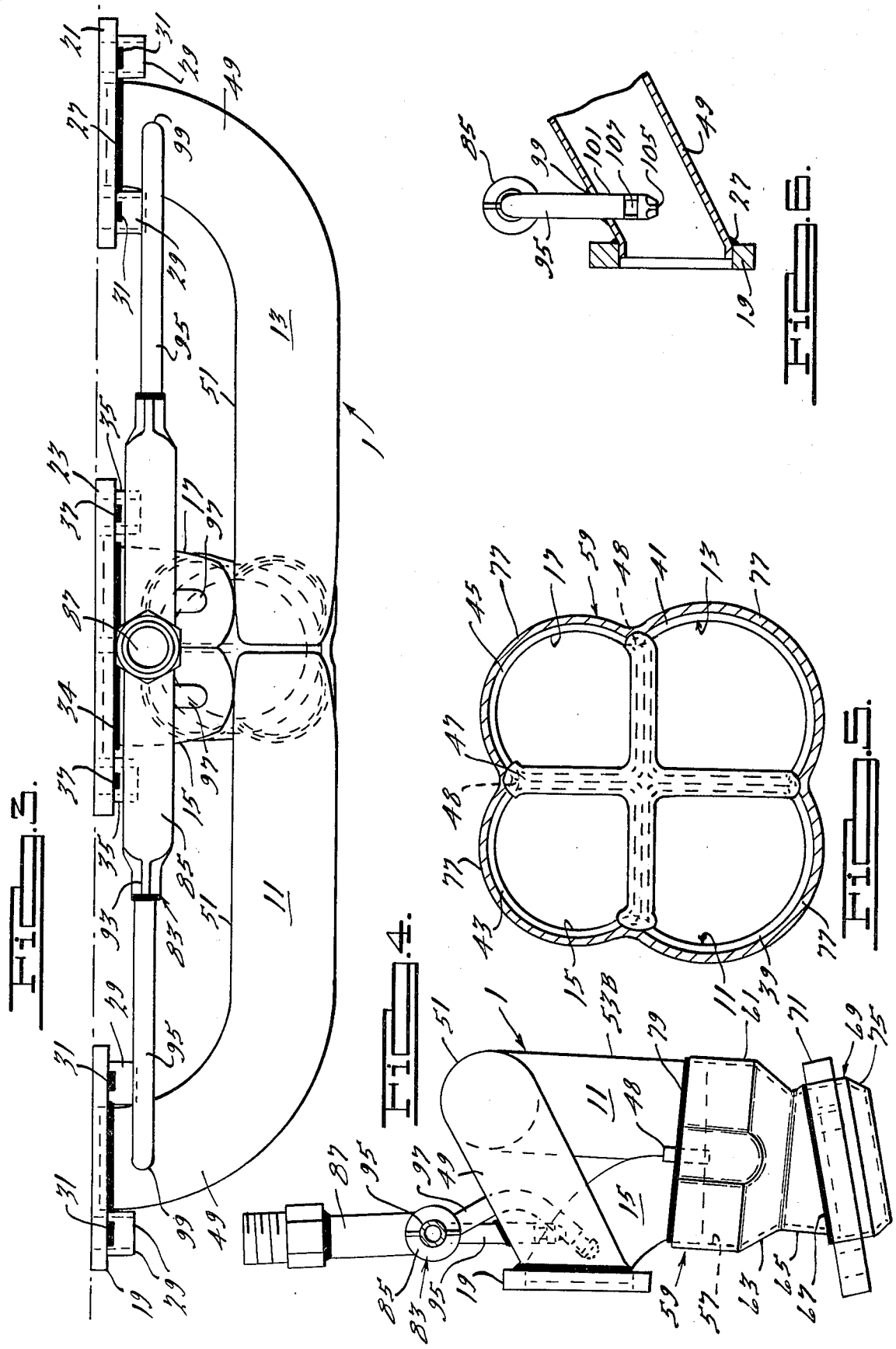

TUBULAR EXHAUST MANIFOLD

BRIEF SUMMARY OF THE INVENTION

This invention relates to internal combustion engines, particularly those used to supply power for automobiles and other motor vehicles.

It is the purpose of the invention to provide an exhaust manifold for internal combustion engines that, as compared with conventional cast iron manifolds, produces a weight reduction and better engine and catalytic converter operation.

The invention accomplishes this purpose by means of a manifold construction composed of fabricated metal (e.g., tubes and stampings) of suitable composition thereby enabling the metal mass and the product to be of minimum weight. The manifold includes a separate pipe for each exhaust port curved to provide relatively smooth patterns for gases as they flow to a common chamber in a collector member that accepts and is joined to the outlet ends of all the pipes. A means for feeding air to the separate pipes is mounted on them in a way to absorb stresses due to temperature differentials and engine/vehicle motion.

Other features and advantages of the invention are set forth hereinafter.

DESCRIPTION OF THE DRAWINGS

FIG. 1 is a schematic side elevation, with parts omitted and broken away, showing the use of an exhaust manifold embodying the invention with an automotive V-8 internal combustion engine and exhaust system;

FIG. 2 is an enlarged side elevation of the exhaust manifold of FIG. 1;

FIG. 3 is a top plan view of the exhaust manifold of FIG. 2;

FIG. 4 is a side elevation, with a part of the air log in section, taken from the left of FIG. 3;

FIG. 5 is a cross-section along line 5—5 of FIG. 2 showing the function of pipes and collector;

FIG. 6 is a cross section along the line 6—6 of FIG. 2, and

FIG. 7 is a cross section along the line 7—7 of FIG. 2.

DESCRIPTION OF THE INVENTION

A tubular exhaust manifold 1 in accordance with the present invention is shown in FIG. 1 bolted to the left side of a V-8 automotive type internal combustion engine 3 to collect exhaust gases emitted through four exhaust ports (not shown) on that side of the engine. The manifold 1 is connected to the upstream end of an exhaust pipe 5 and discharges exhaust gases into it so that they may flow downstream to a catalytic converter 7 which, in turn, discharges treated gases into a conduit 9 that carries them downstream to a sound attenuating muffler (not shown) and to discharge at the rear of an automobile or other vehicle empowered by the engine 3.

The manifold 1 is essentially symmetrical with respect to a longitudinal midplane and, as seen in FIGS. 1, 2, and 3, has relatively long left and right hand tubular headers or pipes 11 and 13, and very short left and right hand tubular headers or pipes 15 and 17. The pipes 11, 13, 15, and 17 are preferably commercially available tubing of circular cross section, originally straight in length, which are bent and shaped to the configurations shown, or to other suitable configurations. Low carbon steel, preferably, stainless and heat resisting, are desirable to facilitate manufacture and to give substantial durability under the punishing conditions imposed on an automobile exhaust system.

The pipes 11, 13, 15, and 17 are separate conduits for exhaust gas leaving four separate cylinders of the engine 3, and are connected to the engine over and in fluid tight communication with their exhaust ports by means of oblong, flat, sheet metal, stamped, symmetrical flanges 19, 21, and 23 of suitable composition. Flanges 19 and 21 for the long tubes 11 and 13 have central openings 25 that are shaped to receive the ends of the tubes, and welds 27 between the tubes and flanges around the edges of the openings make the connections fluid tight. Opposite ends of the flanges 19 and 21 have fastener openings that are located substantially on the common midplane of the tube openings 25. Short stand-off fastener tubes 29 engage the flanges in line with the openings, and are welded to the flanges 19 and 21 as indicated at 31. Threaded fasteners may extend through the tubes 29 into the engine block, and the outer ends of the tubes 29 are squared off to provide bearing surfaces for bolt heads or nuts whereby appropriate clamp load may be achieved to provide tight, lasting connection to the engine 3. The flange 23 is similar in principle to flanges 19 and 21 but has two openings 33 shaped to receive the ends of pipes 15 and 17, there being welds 34 corresponding to welds 27 around the edges of openings 33 to rigidly, and in gas tight manner, unite the pipes 15 and 17 and the flange 23. The opposite ends of flange 23 also have openings in line with the ends of fastener stand-off tubes 35 (corresponding to tubes 29) that are located substantially on the common midplane of the ends of the pipes 11, 13, 15, and 17 and the respective flange openings 25 and 33 for them. The tubes 35 are welded at 37 to the flange. As seen in FIG. 3, the outer faces of the flanges 19, 23, and 21 lie substantially in a common plane corresponding to that of the engine face against which they are to be bolted. The inherent elasticity of the pipes enables the flanges to become slightly non-coplanar to accommodate irregularities in the engine face.

The long tubes 11 and 13 have outlet ends 39 and 41 and the short tubes 15 and 17 have outlet ends 43 and 45. These four outlet ends terminate in substantially a common plane and are bunched together in actual or substantial contact with each other, as seen best in FIG. 5, with the ends 39 and 41 side-by-side on the outside and the ends 43 and 45 side-by-side on the inside of the manifold with respect to the engine side of the manifold. Preferably, the half-diameter segments of the pipe end cross sections that are closest to the other pipe ends are shaped from semi-circular to substantially right-triangular, as seen best in FIG. 5, to facilitate nesting together and rigid interconnection by way of the large, transverse cruciform weld 47 rigidly uniting the ends 39, 41, 43 and 45 and four longitudinal welds 48 between adjacent tubes at the four ends of the transverse weld 47. Preferably, the inlet end cross sections of the four pipes are also shaped from the round cross sections of the respective pipes into substantially square cross sections with generously rounded corners as seen best in FIG. 2.

The short pipes 15 and 17 are each of a simple right angle configuration as seen best in FIG. 4. The long pipes 11 and 13 are rather horn-shaped to provide clearance of and access to fasteners in stand-off tubes 29 and 35 and balanced, low resistance gas flow through the pipes. Each long pipe has an upwardly slanted inlet portion 49 which is also curved inwardly to gradually blend with a longitudinally extending, relatively long, intermediate portion 51 that is substantially parallel to the length of the engine 3. An outlet portion 53 follows a generous downward curve 53A to flow into a straight downwardly extending section 53B, substantially normal to intermediate portion 51, and back-slanted slightly as seen in FIG. 4. The curved sections 53A may have flat indentations 53C formed in them to provide complete tool access and clearance to the stand-off tubes 35. The upwardly slanted, curved inlet portions 49 provide tool access and clearance for the inner stand-off tubes 29 on outer flanges 19 and 21.

The outlet ends 39, 41, 43, and 45 are received in and empty into a collection chamber 57 formed by the hollow interior of the tubular metal collector member 59. The collector member has a large diameter inlet portion 61, a conical intermediate portion 65, and a smaller diameter outlet portion 65 that may be cut off on a slant to form an end welded at 67 to a bushing 69. The bushing has a flange 71 welded to it whereby collector 59 (and manifold 1) may be bolted in a gas tight joint to flange 73 on the exhaust pipe 5 with the shaped exit end 75 of bushing 69 fitting on a suitable mating surface at the inlet end of pipe 5. The large diameter portion 61 of the collector 59 is preferably shaped into curved sections 77 that fit close to the semi-circular outer portions of the pipe ends 39, 41, 43, and 45, as seen best in FIG. 5. The inlet end edge of the collector portion 61 is united by a weld 79, extending all the way around the collector, to the respective tube ends 39, 41, 43, and 45. Weld 79 intersects the four welds 48 and rigidly integrates the ends of the four pipes and the collector 59, and in conjunction with welds 47 and 48 produces a strong, gas-tight manifold base containing the collection and mixing chamber 57 to which gas from all four cylinders is delivered and from which it flows to the catalytic conversion and sound attenuation system.

The manifold 1 includes means 83 for injecting air into the pipes 11, 13, 15, and 17 adjacent their connections with their respective exhaust ports in order to complete combustion of some unburned exhaust gases and facilitate operation of the catalytic converter 7. Air feed means 83 includes a longitudinal tubular log 85, extending in a plane parallel to flanges 19, 21, and 23, that has a vertical air inlet tube 87 that may be connected by a suitable conduit 89, preferably flexible, to an engine driven compressor 91 or other suitable source of air. The metal alloy tube 85 has pinched down ends that, as shown at 93, are clamped around and welded to the inlet ends of long metal alloy, air feed tubes or runners 95 which conduct air to the long pipes 11 and 13. Short air, metal alloy, feeder tubes or runners 97, extending in planes perpendicular to the log 85, have inlet ends projecting through openings in the log and welded to it and conduct air from the log to pipes 15 and 17. The four runners 95 and 97 are welded at their outlet ends to the respective pipes 11, 13, 15, and 17, as indicated at 99, and provide support means for the log 85 on the pipes.

During operation of the engine 3, there are large temperature differentials between opposite ends of the runners 95 and 97 and between the log 85 and the pipes 11, 13, 15, and 17 on which it is mounted by means of the runners. To absorb the stresses that such differentials create, the runners have non-linear configurations in the planes in which they extend. Preferably, the long runners 95 are serpentine or S-shaped as seen best in FIG. 2; and the short runners 97 have simple shallow C-shape curvatures as seen best in FIGS. 4 and 7. These configurations can accept expansion and contraction of the runners in the direction of their lengths as well as temperature related dimensional changes or other forces acting between the log 85 and the pipes so that rupture of the welds or the metal of tubes and log is avoided. At the same time, the log 85 is supported in a relatively stable manner on the pipes because of the normal stiffness of the tubular runners in conjunction with the arrangement of long tubes 95 in a plane at a right angle to the longitudinally spaced planes of short tubes 97. Additionally, the natural elasticity of the metal runner tubes 95 and 97 furnishes sufficient resiliency to accommodate slight shifts in relative positions of different parts of the manifold such as might occur, for example, when it is bolted to the engine.

As seen best in FIG. 6, the long runners 95 have straight outlet end portions 101 that extend inside of the inlet ends of long pipes 11 and 13. As seen best in FIG. 7, the short runners 97 have straight outlet end portions 103 that extend inside of the inlet ends of short pipes 13 and 15. Both end portions 101 and 103 are, preferably, located on the midplane of the pipes they enter; and the curvature of short runners 97 is preferably such that they are substantially perpendicular to the pipes 15 and 17 as well as to the log 85. Preferably, the ends of the portions 101 and 103 are crimped shut as shown at 105 and air outlet openings are provided by a pair of substantially square apertures 107 in opposite sides of each tube oriented in the manner illustrated in the drawings, i.e., on the front and rear sides of the tubes. Other dispositions of the end portions 101 and 103 and arrangement of outlet apertures 107 may be used to provide most effective air distribution for particular engine systems.

The fabricated metal exhaust manifold 1 of this invention is a significant improvement over conventional cast iron manifolds ordinarily used with automotive internal combustion engines. In the conventional manifold, exhaust gas from each of the four exhaust ports would flow directly into a common chamber. Use of the separate tubes 11, 13, 15, and 17 provides a means for the design engineer to improve engine performance and efficiency by tuning them to some extent to the individual cylinders. The smooth, gently curving walls of the pipes reduce turbulence and improve gas flow. The savings in weight over a cast iron manifold may easily be 50% to 65% or more per manifold. For example, the manifold 1 for a certain application weighs about 5 pounds while the corresponding cast iron manifold weighs about 12 pounds. The improved flow efficiency combined with the significant vehicle weight reduction enable the manifold 1 to make an important contribution to economy of engine operation and fuel conservation. Additionally, the manifold 1, being much lighter than a cast iron manifold, is much less of a heat sink and permits more engine heat to reach the catalytic converter 7, particularly on engine start-up, thereby improving the efficiency and effectiveness of the catalytic conversion system. The air feed means 83 to the separate exhaust ports also promotes combustion of unburned constituents in the gases.

Mechanical features of the manifold 1 have been previously mentioned. The design is neat and simple, sturdy and durable, occupies only a small space and therefore defines a small envelope, provides accessibility for easy installation, and accepts significant loads encountered in actual engine and vehicle operation, as well as at assembly, without material failures. As compared with the one piece bearing surface on a typical cast iron manifold, the three flanges 19, 21, and 23 in conjunction with elasticity of the pipes permit some slight degree of conformability to irregularities in the bearing surfaces at the individual exhaust ports and by this feature as well reduction in the total length of the bearing surface promote better sealing.

Modifications may be made in the specific structure shown without departing from the spirit and scope of the invention.

I claim:

1. A fabricated metal exhaust gas manifold for an internal combustion engine, said engine having separate four in line exhaust gas ports for four different cylinders opening out of an outer surface of the engine, said manifold defining a compact envelope having a length corresponding to the distance between the first and last of said gas ports and a width and a height that are significantly less than said length and comprising a collector member having an outlet bushing for connection to an exhaust pipe and an internal exhaust gas collecting and mixing chamber in gas flow communication with said outlet, a pair of outer long pipes and a pair of inner short pipes having outlet ends bunched together inside said collector member with their outlet ends opening into said chamber, first means uniting said collector member and outlet ends in a rigid and gas-tight manner, said pipes extending away from said collector member and curving substantially 90° away from said collector member and spaced from one another so that they may be connected to different exhaust gas ports, said long pipes extending to the first and last of said four in line gas ports and said short pipes extending to the second and third of said gas ports, said pipes having inlet ends each adapted to receive gas from an exhaust gas port, and second means including a plurality of separate flanges mounted on said inlet ends for removably attaching the pipes to the outer surface of an engine in gas flow communication with the exhaust gas ports, said collector member being substantially tubular and said flanges being substantially flat and coplanar, said outlet ends and said collector member extending in a direction substantially parallel to the plane of said flanges, the outer ends of said inner short pair of pipes being adjacent to said plane and the outlet ends of said outer long pipes being spaced away from said plane by the outlet ends of said short pipes.

2. A manifold as set forth in claim 1 wherein said flanges include aperture means to receive fasteners attaching them to the engine, said pipes having a configuration such that they are out of alignment with the axes of said fastener means and with fasteners received therein.

3. A manifold as set forth in claim 2 wherein said manifold is substantially symmetrical.

4. A manifold as set forth in claim 3 wherein the outer long pair of pipes on opposite sides of said collector member include relative long portions extending substantially parallel to said plane and perpendicular to the axis of the collector to define the length of said envelope.

5. A manifold as set forth in claim 1 wherein said outlet ends are shaped to fit together and wherein said first means comprises weld metal fusing the pipes to each other and to the collector.

6. A manifold as set forth in claim 5 wherein the inner peripheries of the outlet ends are squared to fit together and said first means includes a cross-shaped weld along the intersection of the outer ends at the end faces thereof.

7. A manifold as set forth in claim 6 wherein said collector member is shaped to fit the outer peripheries of the outlet ends of the pipes.

8. A manifold as set forth in claim 1 including third means mounted on the pipes for feeding air to exhaust gases in the manifold, said third means including a tubular log and a plurality of tubular runners extending from the log to the inlet ends of the pipes and supporting the log on the pipes.

9. A manifold as set forth in claim 8 wherein the runners are fixed at one end to the log and at the other end to the pipes.

10. A manifold as set forth in claim 9 wherein the runners are non-linear and include curvatures to absorb loads applied to them by changes in positions between the log and the pipes.

11. A manifold as set forth in claim 10 wherein certain of said pipes are relatively long and the runners to said pipes include an S-shaped configuration to absorb loads.

12. A manifold as set forth in claim 4 wherein said manifold envelope includes third means mounted on the pipes for feeding air to exhaust gases in the manifold, said third means including a tubular log extending substantially parallel to said long portions and located between said long portions and said flanges, relatively long, stiff, tubular runners extending from opposite ends of said log to the inlet ends of said outermost pipes, relatively short, stiff, tubular runners extending from an intermediate part of the log to the inlet ends of the innermost of said pipes, said long runners being welded to the log and to the pipes and extending substantially parallel to the log, said short runners being welded to the log and to the pipes and being substantially perpendicular to the log.

13. A manifold as set forth in claim 12 wherein said runners are non-linear and include curvatures to absorb loads applied to them by changes in position between the log and pipes.

14. A manifold as set forth in claim 13 wherein the long runners have a substantially S-shaped configuration.

15. A manifold as set forth in claim 13 wherein the short runners have a substantially C-shaped configuration.

16. A manifold as set forth in claim 15 wherein the long runners have a substantially S-shaped configuration.

17. A manifold as set forth in claim 2 wherein said aperture means includes stand off tubes seated upon the flanges and welded thereto.

* * * * *